(12) United States Patent
Wright et al.

(10) Patent No.: US 11,059,562 B2
(45) Date of Patent: Jul. 13, 2021

(54) AIR VEHICLE AND METHOD AND APPARATUS FOR CONTROL THEREOF

(71) Applicant: BAE Systems plc, London (GB)

(72) Inventors: Julian David Wright, Preston (GB); Nicholas Giacomo Robert Colosimo, Preston (GB); Clyde Warsop, Bristol (GB)

(73) Assignee: BAE Systems plc, London (GB)

( * ) Notice: Subject to any disclaimer, the term of this patent is extended or adjusted under 35 U.S.C. 154(b) by 742 days.

(21) Appl. No.: 15/768,744

(22) PCT Filed: Oct. 28, 2016

(86) PCT No.: PCT/GB2016/053348
§ 371 (c)(1),
(2) Date: Apr. 16, 2018

(87) PCT Pub. No.: WO2017/072520
PCT Pub. Date: May 4, 2017

(65) Prior Publication Data
US 2018/0297688 A1 Oct. 18, 2018

(30) Foreign Application Priority Data

Oct. 30, 2015 (EP) ..................................... 15275223
Oct. 30, 2015 (GB) ..................................... 1519178

(51) Int. Cl.
*B64C 3/46* (2006.01)
*B64C 3/48* (2006.01)
(Continued)

(52) U.S. Cl.
CPC .................. *B64C 3/46* (2013.01); *B64C 3/48* (2013.01); *B64C 39/024* (2013.01); *B64C 29/00* (2013.01);
(Continued)

(58) Field of Classification Search
CPC ........... B64C 3/46; B64C 39/024; B64C 3/48; B64C 29/00; B64C 2201/021; B64C 3/44; Y02T 50/10
See application file for complete search history.

(56) References Cited

U.S. PATENT DOCUMENTS

| | | |
|---|---|---|
| 1,790,309 A | 1/1931 | Keintz |
| 2,349,858 A | 5/1944 | Gillmor |
(Continued)

FOREIGN PATENT DOCUMENTS

| | | |
|---|---|---|
| CN | 104787315 A | 7/2015 |
| CN | 204822073 U | 12/2015 |
(Continued)

OTHER PUBLICATIONS

Notice of Allowance for U.S. Appl. No. 15/768,729, dated Jun. 25, 2020, 16 Pages.
(Continued)

*Primary Examiner* — Valentina Xavier
(74) *Attorney, Agent, or Firm* — Maine Cernota & Rardin (57) ABSTRACT

A wing member (14*b*) for an air vehicle (10), said wing member comprising a core section (20) defining its longitudinal axis and having upper and lower surfaces, at least one of said surfaces comprising apparatus (22) selectively configurable between at least two positions, wherein in a fully extended position, at least portions of said apparatus extend outwardly from said respective surface so as to increase the effective cross-sectional area of said wing member and define an effective aerofoil in respect thereof.

20 Claims, 7 Drawing Sheets

(51) Int. Cl.
  *B64C 39/02* (2006.01)
  *B64C 29/00* (2006.01)
(52) U.S. Cl.
  CPC ......... *B64C 2201/021* (2013.01); *Y02T 50/10* (2013.01)

(56) References Cited

U.S. PATENT DOCUMENTS

| | | | |
|---|---|---|---|
| 2,479,125 | A | 8/1949 | Leonard |
| 3,136,501 | A | 6/1964 | Barber |
| 4,123,020 | A | 10/1978 | Korsak |
| 4,391,424 | A * | 7/1983 | Bartoe, Jr. ............... B64C 9/32 244/207 |
| 4,522,104 | A | 6/1985 | Degen |
| 5,267,885 | A | 12/1993 | Niskern |
| 5,279,199 | A | 1/1994 | August |
| 5,765,783 | A | 6/1998 | Albion |
| 6,260,796 | B1 | 7/2001 | Klingensmith |
| 6,477,326 | B1 | 11/2002 | Partynski |
| 8,544,788 | B1 | 10/2013 | Capper |
| 9,085,354 | B1 | 7/2015 | Peeters |
| 2003/0179288 | A1 | 9/2003 | Jones |
| 2003/0185549 | A1 | 10/2003 | Partynski |
| 2008/0105112 | A1 | 5/2008 | Grabmeier |
| 2008/0223994 | A1* | 9/2008 | Greenley ............... A63H 27/02 244/7 R |
| 2010/0025543 | A1 | 2/2010 | Kinsey et al. |
| 2010/0228406 | A1 | 9/2010 | Hamke |
| 2010/0252690 | A1 | 10/2010 | Hothi |
| 2012/0248259 | A1 | 10/2012 | Page et al. |
| 2013/0162761 | A1 | 6/2013 | Goldemann |
| 2013/0250047 | A1 | 9/2013 | Hollinger |
| 2014/0008498 | A1 | 1/2014 | Reiter |
| 2014/0340427 | A1 | 11/2014 | Baker |
| 2018/0370624 | A1 | 12/2018 | Seale |

FOREIGN PATENT DOCUMENTS

| | | |
|---|---|---|
| DE | 1269497 B | 5/1968 |
| DE | 102006021182 A1 | 11/2007 |
| DE | 102007054126 A1 | 5/2009 |
| EP | 1873058 A2 | 1/2008 |
| FR | 757191 A | 12/1933 |
| FR | 2246444 A1 | 5/1975 |
| FR | 2379430 A2 | 9/1978 |
| FR | 2796454 A1 | 1/2001 |
| GB | 272455 A | 12/1927 |
| GB | 2514582 A | 12/2014 |
| JP | H03292294 A | 12/1991 |
| JP | 2012111475 A | 6/2012 |
| RU | 2072942 C1 | 2/1997 |
| RU | 2330790 C2 | 8/2008 |
| WO | 03063513 A1 | 7/2003 |
| WO | 2008112686 A1 | 9/2008 |
| WO | 2009059173 A1 | 5/2009 |
| WO | 2012029063 A1 | 3/2012 |
| WO | 2012035153 A1 | 3/2012 |
| WO | 2013109742 A1 | 7/2013 |
| WO | 2013120912 A1 | 8/2013 |
| WO | 2014118299 A1 | 8/2014 |
| WO | 2014177591 A1 | 11/2014 |
| WO | 2016109408 A | 7/2016 |
| WO | 2017007915 A1 | 1/2017 |

OTHER PUBLICATIONS

Notice of Allowance for U.S. Appl. No. 15/768,716, dated Aug. 3, 2020, 18 Pages.
Notice of Allowance for U.S. Appl. No. 15/768,201, dated Apr. 28, 2021, 24 pages.
International Search Report and Written Opinion of International Application No. PCT/GB2016/053347. dated Jan. 18, 2017, 13 pages.
Search Report under Section 17(5) of Great Britain Application No. GB1519180.2, dated Apr. 27, 2016, 3 pages.
Combined Search and Examination Report under Sections 17 and 18(3) of Great Britain Application No. GB1618228.9, dated Mar. 29, 2017, 7 pages.
Extended European Search Report of European Application No. EP15275224, dated Mar. 24, 2016, 8 pages.
International Search Report and Written Opinion of International Application No. PCT/GB2016/053348, dated Jan. 19, 2017, 18 pages.
Search Report under Section 17(5) of Great Britain Application No. GB1519178.6, dated Apr. 25, 2016, 3 pages.
Combined Search and Examination Report under Sections 17 and 18(3) of Great Britain Application No. GB1618236.2, dated Mar. 30, 2017, 6 pages.
Extended European Search Report of European Application No. EP15275223.4, dated Jun. 6, 2016, 12 pages.
International Search Report and Written Opinion of International Application No. PCT/GB202016053345, dated Jan. 11, 2017, 12 pages.
Search Report under Section 17(5) of Great Britain Application No. GB1519177.8, dated Apr. 25, 2016, 4 pages.
Extended European Search Report of European Application No. EP15275222.6, dated Apr. 27, 2016, 8 pages.
International Search Report and Written Opinion of International Application No. PCT/GB2016/053346, dated Jan. 9, 2017, 15 pages.
Search Report under Section 17(5) of Great Britain Application No. GB1519183.6, dated Apr. 29, 2016, 3 pages.
Combined Search and Examination Report under Sections 17 and 18(3) of Great Britain Application No. GB1618221.4, dated Mar. 23, 2017, 5 pages.
[Squadrone Systems] Hexo+ aerial drone system Kickstarter page, explaining key features, stored bu internet archive on Jul. 26, 2014. Found at http://web.archive.org/web/20140726061306/https://www.kickstarter.com/projects/sqdr/hexo-your-autonomous-aerial-camera Accessed Mar. 3, 2017.
Extended European Search Report of European Application No. EP15275226.7, dated Jul. 4, 2016, 12 pages.
International Search Report and Written Opinion of International Application No. PCT/GB2016/053353, dated Dec. 15, 2016, 11 pages.
Search Report under Section 17(5) of Great Britain Application No. GB1519181.0, dated Apr. 28, 2016, 3 pages.
Extended European Search Report of European Application No. EP15275225.9, dated May 13, 2016, 8 pages.
Office Action for U.S. Appl. No. 15/768,201, dated Jan. 25, 2021, 5 Pages.
International Preliminary Report on Patentability of International Application No. PCTGB2016053346, dated May 11, 2018, 11 pages.
International Preliminary Report on Patentability of International Application No. PCTGB2016053347, dated May 11, 2018, 9 pages.
International Preliminary Report on Patentability of International Application No. PCTGB2016053348, dated May 11, 2018, 11 pages.
International Preliminary Report on Patentability of International Application No. PCTGB2016053345, dated May 11, 2018, 8 pages.
International Preliminary Report on Patentability of International Application No. PCTGB2016053353, dated May 11, 2018, 8 pages.

* cited by examiner

(ii) Sections separate forming an extra pair of wings - extra lift 15a
15b

Fig. 9A (i)

14a
14b (ii) Cross section of wing 14b
15a
15b

AIR VEHICLE AND METHOD AND APPARATUS FOR CONTROL THEREOF

RELATED APPLICATIONS

This application is a national phase application filed under 35 USC § 371 of PCT Application No. PCT/GB2016/053348 with an International filing date of Oct. 28, 2016 which claims priority of GB Patent Application 1519178.6 filed Oct. 30, 2015 and EP Patent Application 15275223.4 filed Oct. 30, 2015. Each of these applications is herein incorporated by reference in its entirety for all purposes.

This invention relates generally to an air vehicle, and, more particularly but not necessarily exclusively, to an unmanned air vehicle (UAV) and method and apparatus for control thereof.

Unmanned air vehicles (UAVs), or drones, are well known and used in many different military, as well as civil and commercial, applications, such as search and rescue, surveillance, reconnaissance, etc. In general, a UAV is a powered aerial vehicle that does not require a human operator, uses aerodynamic forces to provide vehicle lift, and can fly autonomously or be piloted remotely. Although not always a requirement, it is often required for such vehicles to be recoverable and even reusable after a mission.

Piloted and unmanned air vehicles tend to be of one of two general types: (i) fixed wing, and (ii) rotary wing.

Figure 1:
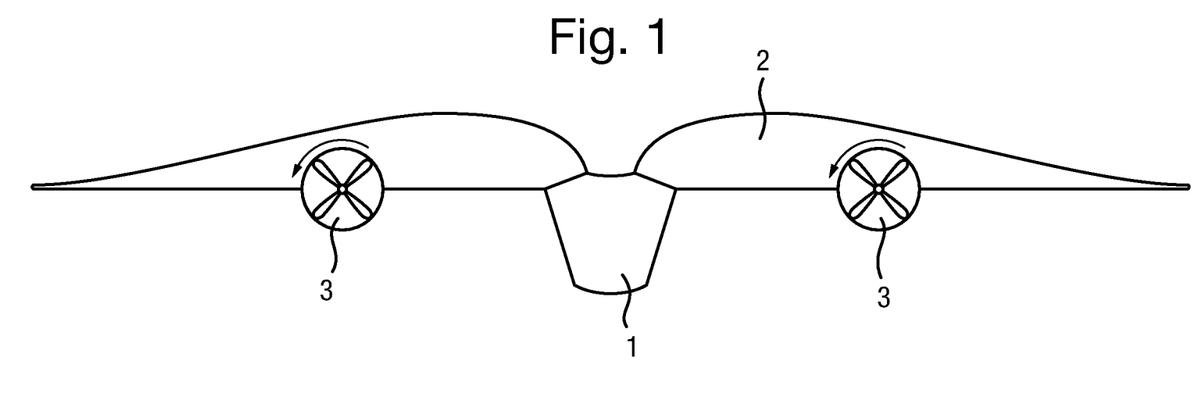
FIG. 1 is a schematic front view of a fixed wing air vehicle according to the prior art.

A fixed wing air vehicle is illustrated schematically in FIG. 1 of the drawings. As shown, a fixed wing air vehicle comprises a main body 1 having a pair of fixed wings 2 extending therefrom, and a respective propulsion (thrust) mechanism 3, such as a jet or propeller, mounted on (or in relation to) each wing 2. The principal advantage of a fixed wing air vehicle is the speed and endurance that can be achieved, making such air vehicles particularly suitable for long-distance and/or persistent missions.

Each respective propulsion device 3 may be mounted at the 'leading' edge of a wing (relative to direction of travel of the air vehicle), with both propulsion devices facing in the same direction, and configured to generate linear thrust in the same direction relative to the main body 1, thereby causing the air vehicle to move forwards.

Figure 3:
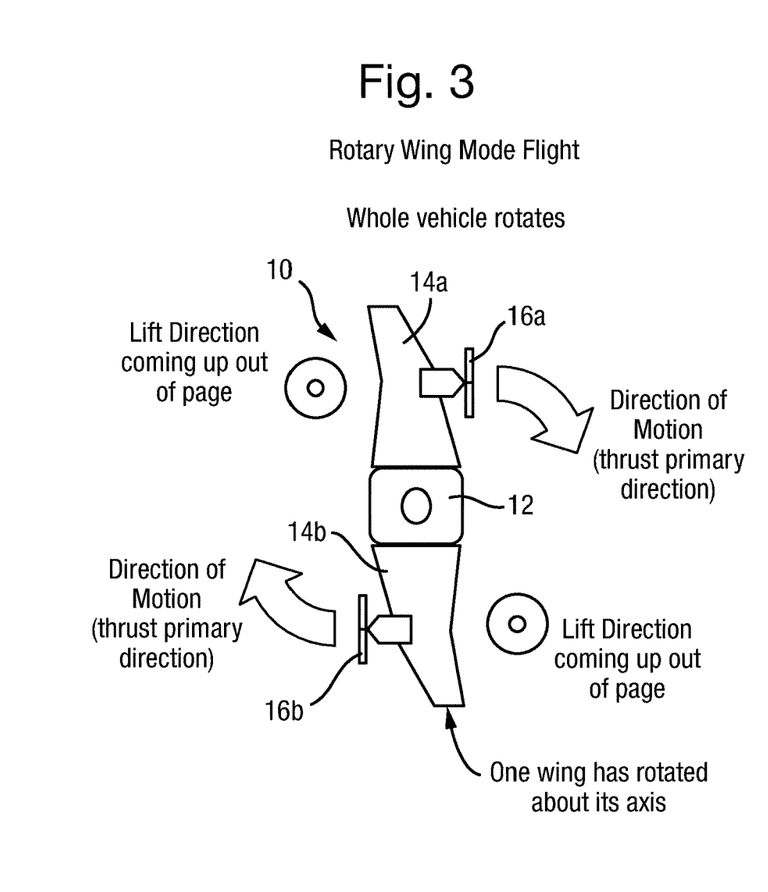
FIG. 3 is a schematic plan view of the hybrid fixed-rotary wing air vehicle of FIG. 2, illustrated in the rotary wing flying mode configuration.
Figure 3A:
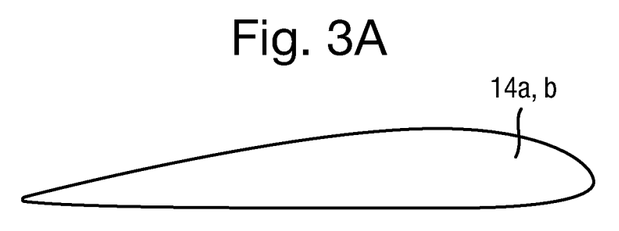
FIG. 3A is a schematic side cross-sectional view of a wing for use in a hybrid fixed-rotary wing air vehicle according to an exemplary embodiment of the present invention.

Referring to FIG. 3 of the drawings, the aerofoil cross-sectional shape of the wings 2 produces an aerodynamic force as the vehicle moves forward, and the component of this force perpendicular to the direction of motion is called "lift" (whereas the component parallel to the direction of motion is called "drag"). "Turning" of the air in the vicinity of the aerofoil creates curved streamlines, resulting in lower pressure on one side and higher pressure on the other. This pressure difference is accompanied by a velocity difference, via Bernouilli's principle, so the resulting flowfield about the aerofoil has a higher average velocity on the upper surface than on the lower surface; and the lift force is related directly to the average top/bottom velocity difference.

Many different aerofoil shapes and cross-sections are known and widely used, wherein two principal aims of the aerofoil are to reduce drag and optimise lift. However, it will be clear from the above that such optimisation of the aerofoil shape is designed in respect of a specific direction of thrust (motion) relative to the main body generated by the propulsion device(s). If the relative direction of thrust (motion) generated by one or both propulsion devices were to change, then the aerofoil shape would no longer be optimised (or even necessarily functional) in respect of the associated propulsion device, and there would be a resulting counter-productive effect on the lift component of the aerodynamic force as the wing(s) move through the air, which is clearly disadvantageous and could, in some cases, be catastrophic.

Nevertheless, applications are envisaged in which it may be advantages to reverse the direction of thrust generated by one or more of the propulsion devices relative to the main body, during a flight.

There are a number of ways in which such thrust reversal relative to the main body could be achieved. For example, in the case of a propeller, the direction of rotary motion thereof could be reversed. In this case, the longer airflow path length defined by the upper surface relative to the lower surface of the wing would be maintained, although the wing shape and profile relative to the direction of thrust (or 'leading' edge of the wing) would be far from optimal. However, reversal of the direction of operation of the propulsion device may be highly impractical in many circumstances, and impossible in the case of a jet engine. Therefore, it is envisaged that the wing on which the propulsion device is mounted could itself be moved so as to change the location and orientation of the associated propulsion device relative to the main body, without changing its mode of operation. In this case, for example, the wing, having the propulsion device mounted at its leading edge, could be rotated through 180° about its central longitudinal axis, so as to move the 'leading' edge and the propulsion device to the 'rear' edge of the wing. As a result, of course, the wing would now be 'upside down', with the longer airflow path now being defined by the lower surface of the wing, which is clearly counter-productive and highly disadvantageous. Furthermore, at some points in the rotary cycle of the propulsion device itself, the aerofoil cross-section of the blades thereof (relative to the direction of motion of the vehicle) is likely to be counter-productive to the horizontal movement of the vehicle.

It is an object of aspects of the present invention to address at least some of these issues and, in accordance with a first aspect of the present invention, there is provided a wing member for an air vehicle, said wing member comprising a core section defining its longitudinal axis and having upper and lower surfaces, wherein said lower surface comprises first apparatus selectively configurable between at least two positions wherein in a first, fully extended position, at least portions of said first apparatus extend outwardly from said lower surface so as to increase the effective cross-sectional area thereof and define an effective aerofoil in respect thereof in a first direction of movement of said wing member, and said upper surface comprises second apparatus selectively configurable between at least two positions wherein, in a first fully extended position, at least portions of said second apparatus extend outwardly from said upper surface so as to increase the effective cross-sectional area thereof and define an effective aerofoil in respect thereof in a second, substantially opposite, direction of movement of said wing member.

The above-mentioned apparatus associated with the upper and/or lower surface may be selectively configurable between said fully extended position and at least a rest position, in which said apparatus is substantially flush with said respective surface. In this case, the apparatus may be selectively configurable between said fully extended position and at least a partially extended position in which extend outwardly from said respective surface to a lesser degree than in said fully extended position so as to increase the effective cross-sectional area of said wing member and define an aerofoil in respect thereof in a respective direction of movement of the air vehicle.

In an exemplary embodiment of the invention, the above-mentioned apparatus associated with the upper and/or lower surface may comprise a plurality of spaced-apart fins mounted on the respective surface for movement between said at least two positions. Each of said plurality of fins may be mounted on said respective surface via a respective actuator. Each of said actuators may be individually controllable to effect movement of a respective fin. In an exemplary embodiment, an elastic and/or flexible skin member may be provided over said plurality of fins so as to couple the distal ends of adjacent fins, and form a substantially continuous outer surface (in respect of airflow). The skin member may comprise a single skin mounted over an entire set of fins, or it may comprise individual web members mounted between the distal ends of adjacent fins.

In an exemplary embodiment of the invention, the above-mentioned apparatus may comprise a first set of spaced-apart fins mounted on said upper surface and a second set of spaced-apart fins mounted on said lower surface of said wing member, each set of fins being configured for operation one of said fully extended and partially extended positions.

In another exemplary embodiment of the invention, the above-mentioned apparatus may comprise at least a first inflatable aero-structure mounted across said upper and/or said lower surface of said wing member. The inflatable aero-structure may be operable between a fully extended position in which it is substantially fully inflated so as to increase the effective cross-sectional area of said wing member in accordance with the respective configuration of said inflatable aero-structure, and at least a second position. The second position may be a rest position in which said inflatable aero-structure is substantially fully deflated and lies substantially flush with said respective surface. Alternatively, the second position may be a partially extended position in which said inflatable aero-structure is partially inflated.

In accordance with another aspect of the present invention, there is provided an air vehicle comprising a main body and a pair of opposing fixed wing members extending laterally from said main body, at least a first propulsion device being configured to generate linear thrust relative to said main body, in use, the air vehicle further comprising a control module for generating a control signal to reverse, in respect of at least one of said propulsion devices, the direction of linear thrust generated thereby relative to said main body, wherein at least one of said wing members is provided with a device for altering the aerofoil cross-section thereof in response to a reversal of thrust direction by a respective propulsion device.

At least one of said wing members may comprise a wing member substantially as described and/or defined above.

In another exemplary embodiment, the wing member may comprise at least two sections, separably mounted together along a longitudinal joint when said direction of linear thrust generated by a respective propulsion device relative to said main body is in a first direction, wherein at least one of said sections is laterally movable relative to the other so as to separate said two sections when said direction of linear thrust generated by said propulsion device relative to said main body is reversed.

In accordance with yet another aspect of the present invention, there is provided a method of controlling the effective aerofoil cross-section of a wing member in an air vehicle substantially as described and/or defined above, the method comprising the steps of:

determining that a direction of thrust generated by a propulsion device has been reversed; and generating one or more control signals configured to actuate said device to alter the aerofoil cross-section of a respective wing member.

These and other aspects of the present invention will be apparent to a person skilled in the art from the following specific description in which embodiments of the present invention are described, by way of examples only, and with reference to the accompanying drawings, in which:

Figure 2:
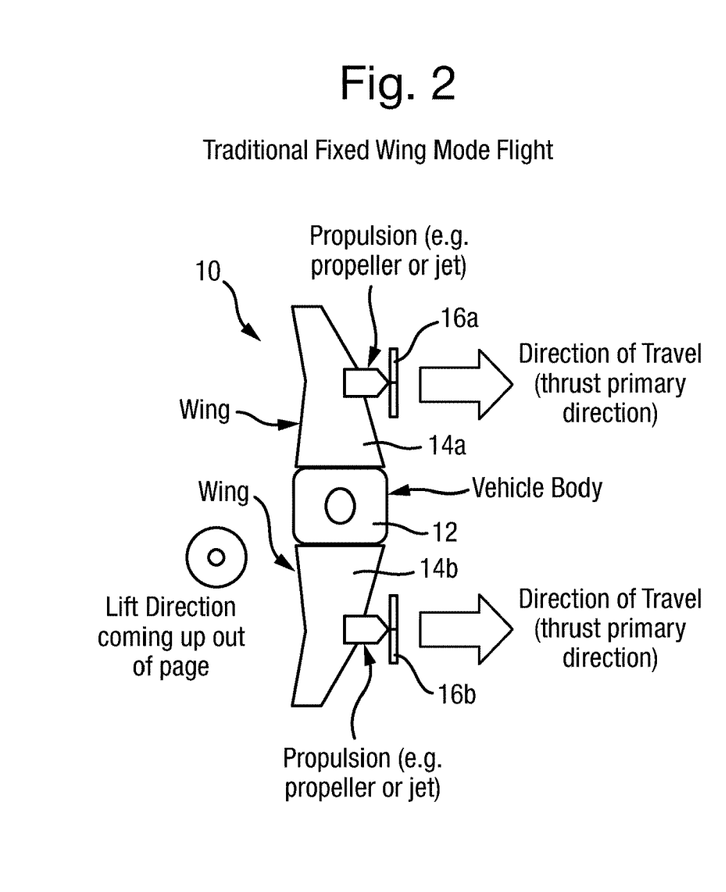
FIG. 2 is a schematic plan view of a hybrid fixed-rotary wing air vehicle according to a first exemplary embodiment of the present invention, illustrated in the fixed wing flying mode configuration.

Referring to FIG. 2 of the drawings, an air vehicle 10 according to a first exemplary embodiment of the present invention comprises a main body 12, on which are mounted two opposing wing members 14a, 14b such that they extend laterally outward from respective opposing sides of the main body 12. In the example shown, the wings 14a, 14b have a compound swept back configuration, to aid aerodynamic stability and reduce drag, but it will be appreciated that the present invention is in no way intended to be limited with regard to its core wing configuration. A respective propulsion device 16a, 16b is mounted at the 'leading' edge of each wing 14a, 14b and, in the example shown, the propulsion devices 16a, 16b are facing in the same direction. Thus, when the propulsion devices are operated to generate thrust in the same direction relative to the main body 12, they cause the vehicle to move forward and create upward lift.

Figure 4:
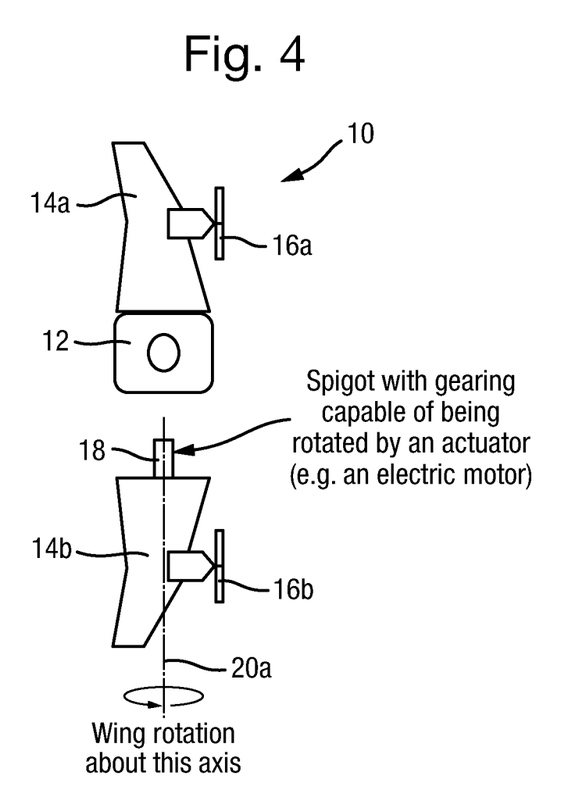
FIG. 4 is a schematic plan view illustrating the manner of connection of a wing to the main body in a hybrid fixed-rotary wing air vehicle according to an exemplary embodiment of the present invention.

Referring additionally to FIG. 4 of the drawings, at least one of the wings 14b may be rotatably mounted on the side of the main body 12 by means of a longitudinal shaft or spigot 18 extending from the innermost end of the wing 14b. Thus, referring to FIG. 3 of the drawings, the air vehicle 10 could be configured such that its flying mode can be transformed from a fixed-wing to a rotary-wing flying mode by the generation of a control signal that causes the wing 14b to rotate about the axis 20a defined by the spigot 18, such that the 'leading' edge of the wing 14b, and the associated propulsion device 16b, are facing in the opposite direction. With the thrust from the two propulsion devices 16a, 16b now operating in opposite linear directions relative to the main body 12, the net result is a rotary force that causes the entire air vehicle 10 to spin. Lift is, theoretically, maintained because the spinning wings act as a rotary blade forcing air downwardly to overcome the force of gravity and create vertical lift. However, such lift will be compromised as the aerofoil defined by the rotated wing is reversed and the longer airflow path is now defined by the lower surface of the wing, thereby resulting in a counter-productive lift component.

It is envisaged that this issue could, in theory, be addressed by effecting an altered angle of attack in respect of the rotated wing 14b, when in the rotary-wing mode. However, this solution is considered to be inefficient, and will not result in an optimal configuration in terms of maximising lift and aerodynamic stability.

Accordingly, in accordance with exemplary embodiments of the present invention, it is proposed to selectively alter the effective cross-sectional shape of an associated aerofoil between the fixed-wing and rotary-wing flying modes described above.

Figure 5A:
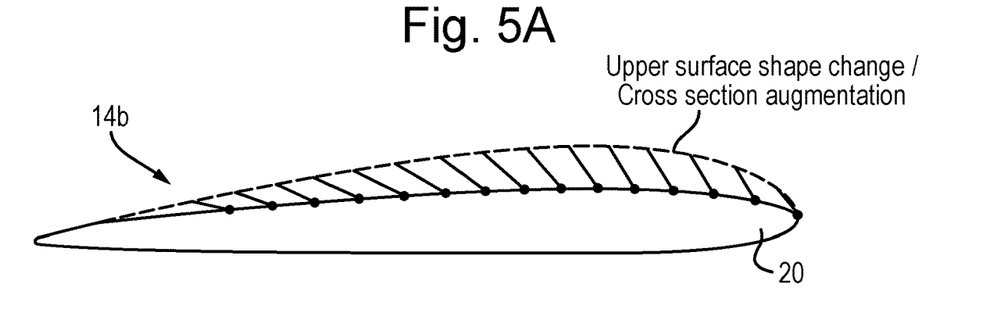
FIGS. 5A and 5B are schematic side views of a wing member according to an exemplary embodiment of the present invention illustrating apparatus for altering the effective aerofoil cross-section thereof in the fully extended position on the upper surface (FIG. 5A) and the lower surface (FIG. 5B) respectively.
Figure 5B:
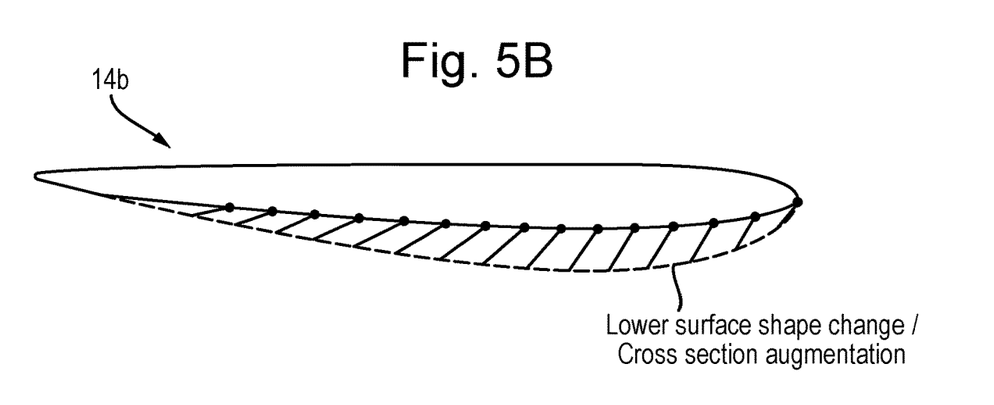
Figure 6A:
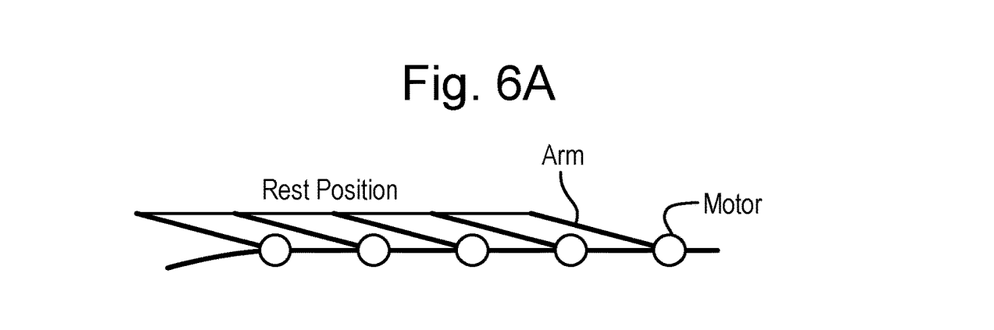
FIGS. 6A and 6B are schematic partial side views of the apparatus illustrated in FIGS. 5A and 5B, showing the fins in the rest positions (FIG. 6A) and the fully extended (deployed) position (FIG. 6B) respectively.
Figure 6B:
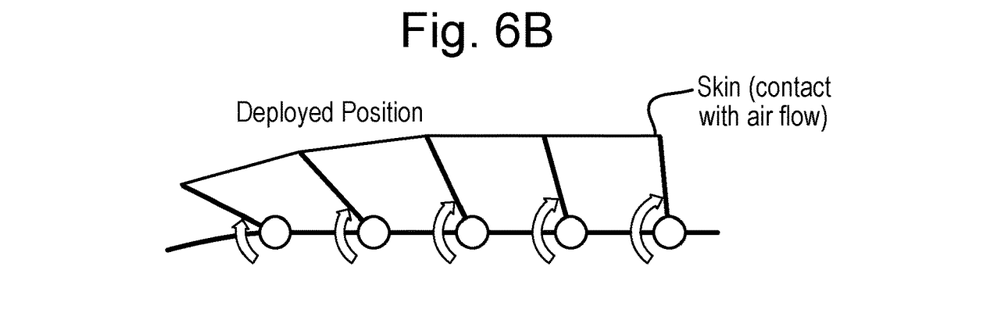

Thus, referring to FIGS. 5A and 5B of the drawings, a wing member 14b comprises a generally central core section 20, which is substantially symmetrical about its longitudinal axis, and has some means for selectively altering the effective cross-sectional shape of the upper and lower surfaces of the wing 14b. In one exemplary embodiment of the invention, such means may comprise a plurality of spaced-apart fins 22 mounted along the upper and lower surfaces of the wing 14b, via respective motorised actuators 24, such that the fins are selectively movable from a rest position (see FIG. 6A of the drawings), in which they lie substantially flat against the surface of the core section 20 on which they are mounted, and a deployed position (see FIG. 6B of the drawings), in which they are raised so as to protrude outwardly (at a selected angle) from their respective surface and have the effect of altering the effective surface profile accordingly. Thus, as shown in FIG. 5A of the drawings, for forward thrust, the fins 22 on the upper surface of the core section 20 are deployed to define the upper curved aerofoil cross-section illustrated, with the radius of the curved profile being defined by the degree to which the individual fins 22 are raised relative to the surface of the core section 20. However, as shown in FIG. 5 of the drawings, when the direction of thrust has been reversed, the upper fins 22 are moved (via the motorised actuators 24) to a rest position, substantially flush against the upper surface of the core section 20, and the lower fins 22 are deployed to define the lower curved aerofoil cross-section illustrated, thereby opti-mising lift in both directions, as required. The fins 22 (or fins or other suitable protruding members) may be of any suitable shape or size, depending on design and operational characteristics of the air vehicle, and may, for example, be formed of any suitable, lightweight composite material.

Figure 7A:
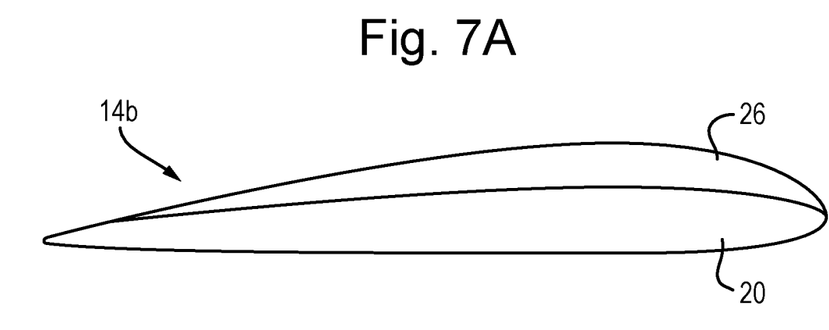
FIGS. 7A and 7B are schematic side views of a wing member according to another exemplary embodiment of the present invention, illustrating apparatus for altering the effective aerofoil cross-section thereof in the fully extended position on the upper surface (FIG. 7A) and the lower surface (FIG. 7B) respectively.
Figure 7B:
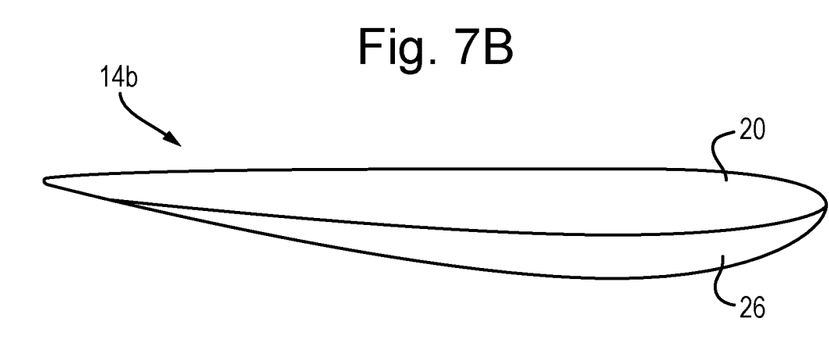

Referring now to FIGS. 7A and 7B of the drawings, in an alternative exemplary embodiment of the present invention, the core section of the wing is provided with an independently deployable inflatable aero-structure 26 on each of its upper and lower surfaces; wherein, when an inflatable aero-structure is deployed, it defines the required aerofoil cross-section of the respective upper or lower surface of the wing. Thus, as shown in FIG. 7A of the drawings, for forward thrust, the inflatable aero-structure on the lower surface of the core section 20 remains at rest, whilst the inflatable aero-structure 26 on the upper surface of the core section 20 is deployed to define the upper curved aerofoil cross-section illustrated, with the radius of the curved profile being defined by the configuration of the inflatable aero-structure and/or the amount of air introduced into the inflatable aero-structure when it is deployed. However, as shown in FIG. 7B of the drawings, when the direction of thrust has been reversed, the upper inflatable aero-structure is deflated to a rest condition, substantially flush against the upper surface of the core section 20, and the lower inflatable aero-structure is deployed to define the lower curved aerofoil cross-section illustrated, thereby optimising lift in both directions, as required.

In general, therefore, aspects of the present invention introduce a concept whereby an aircraft wing is 'augmented' such that it can change its profile/shape on the upper or lower surface so as to attain a desired aerofoil cross-section, dependent upon the mode of flight, for example, or wing orientation relative to the associated thrust direction.

Figure 8A:
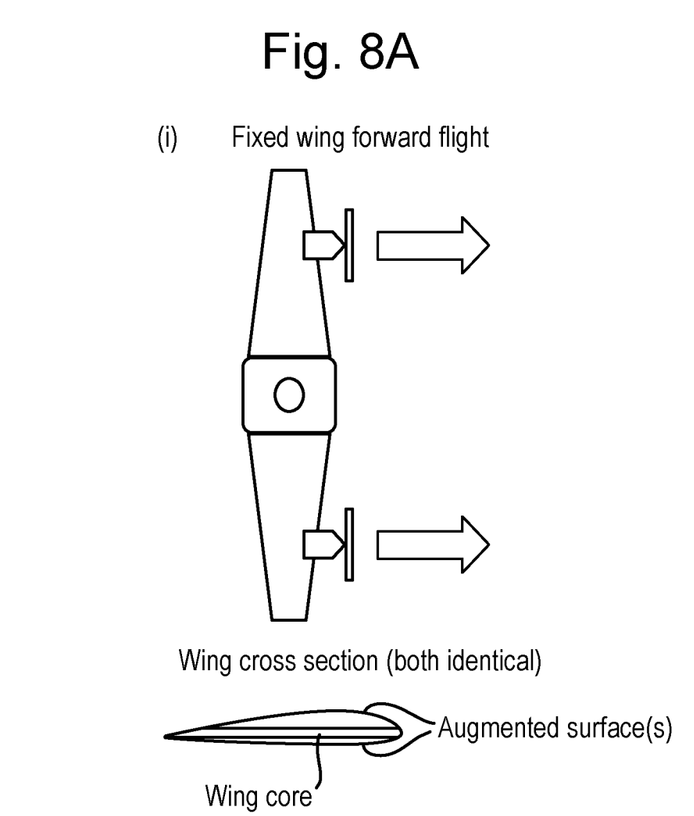
FIG. 8A shows (i) a schematic plan view of a hybrid fixed-rotary wing air vehicle according to a second exemplary embodiment of the present invention, illustrated in the fixed wing flying mode configuration, and (ii) a schematic side view of a wing member of the illustrated air vehicle.
Figure 8B:
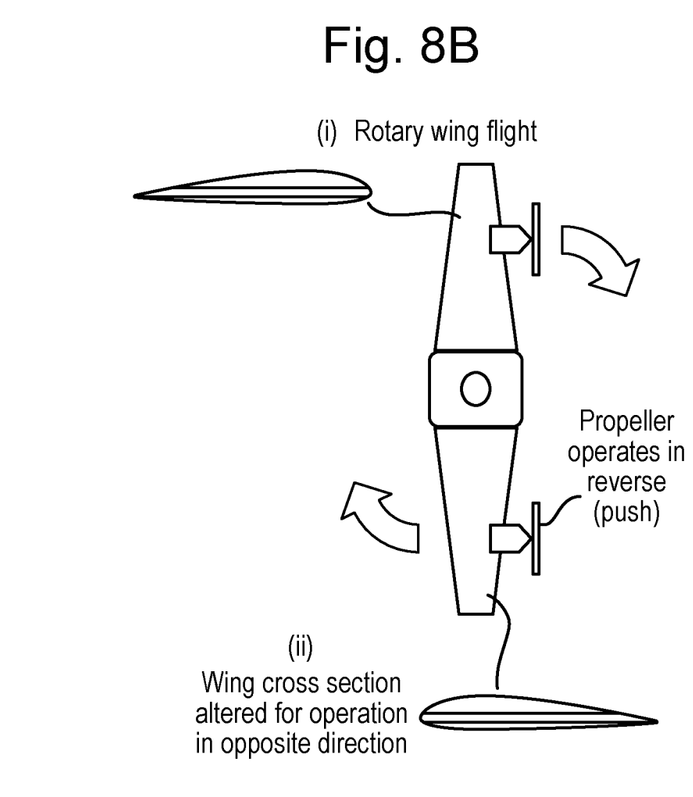
FIG. 8B shows (i) a schematic plan view of the hybrid fixed-rotary wing air vehicle of FIG. 8A, illustrated in the rotary wing flying mode configuration, and (ii) a schematic side view of a wing member of the illustrated air vehicle in which the effective aerofoil cross-section thereof has been altered in response to a change of direction of thrust generated by the respective propulsion device.

Referring now to FIGS. 8A and 8B of the drawings, in alternative exemplary embodiments of the invention, the direction of thrust may be reversed by changing the mode of operation of the respective propulsion device, rather than actually changing the orientation of the wing. In this case, as the wing remains stationary, the respective surfaces thereof remain in situ and the upper surface remains the surface providing the longer airflow path. However, its profile relative to the direction of airflow is non-optimal and, as a result, the required "turning" of the air as the vehicle moves is not effectively achieved. Thus, in accordance with another exemplary embodiment of the invention, some means may be provided on each surface of a core section 20 for changing the effective upper and lower surface profiles in response to a change of thrust direction. In the example shown, and referring to FIG. 8A of the drawings, during fixed-wing flight mode, the propulsion devices 16a, 16b are mounted on the leading edges of respective wing members 14a, 14b and are both configured to generate forward thrust (see (i)). The wing members 14a, 14b are designed to optimise lift whilst the vehicle travels in the forward direction, with the curvature of the upper and lower surfaces being such that the widest part of the wing is close to its proximal end (nearest the main body 12) and the narrowest part of the wing is at its distal end (see (ii)). Referring now to FIG. 8B of the drawings, the operation of one of the propulsion devices 16b is reversed, such that it generates thrust in the opposite direction relative to the main body 12 and, as a result, the entire air vehicle is caused to spin. In response to this change of flying mode, exemplary embodiments of the invention provide means for altering the surface profile of the upper and lower surfaces of the wing member 14b such that the widest portion is now close to its distal end and the narrowest portion is at its proximal end, thereby to optimise lift in the rotary-wing mode. Such alteration of the surface profile may once again be achieved by the provision of reconfigurable inflatable aero-structures on the upper and lower surfaces of a core section 20. Alternatively, the radius of curvature of the surface profiles may be altered by selectively altering the angle of protrusion of a plurality of spaced-apart fins or fins mounted, via motorised actuators, on respective upper and lower surfaces of a core section 20 of the wing member 14*b* (similar to that described with reference to FIGS. 5A and 5B of the drawings).

Figure 9A:
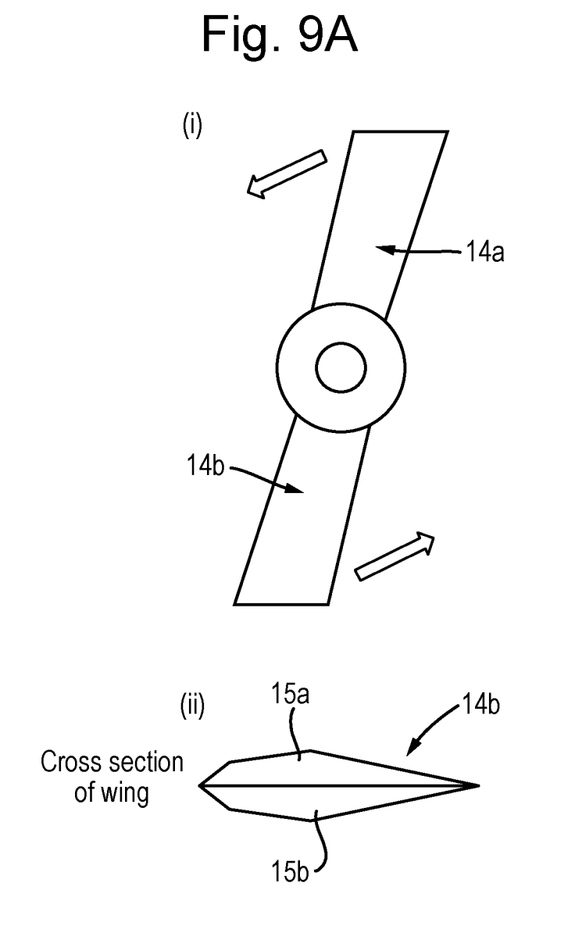
FIGS. 9A and 9B are schematic (i) plan and (ii) side views of a wing member according to an exemplary embodiment of the present invention in a fully extended (joined) configuration (FIG. 9A) and a separated configuration (FIG. 9B) respectively.
Figure 9B:
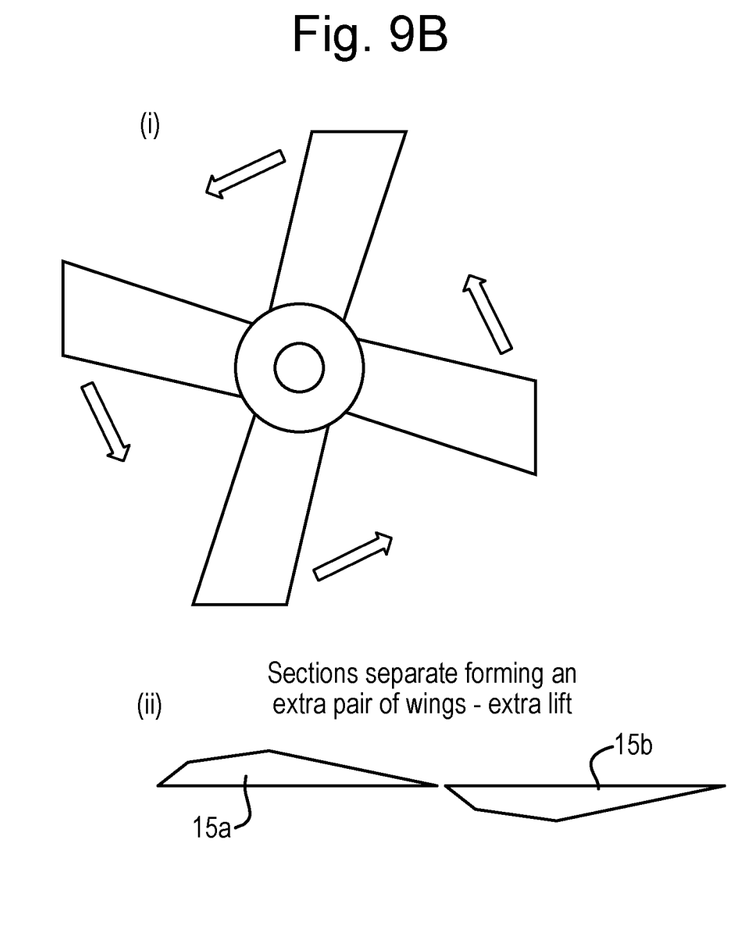

Referring now to FIGS. 9A and 9B of the drawings, in yet another exemplary embodiment of the present invention, the wing members 14*a*, 14*b* may comprise two halves or sections 15*a*, 15*b* (see (ii)). The sections of each wing member 14*a*, 14*b*, which may be substantially identically configured, may be movably mounted relative to each other, and configured to fit together in the fixed-wing flying mode so as to define an aerofoil that is substantially symmetrical about its central longitudinal axis, similar to a conventional aerofoil for this purpose. Referring to FIG. 8B of the drawings, when operation of the air vehicle is changed from the fixed-wing mode to the rotary-wing mode of flying, the (or each) wing member is configured to separate into the two sections 15*a*, 15*b*, with one of the sections having its widest portion closest to the periphery of its rotary motion, and the other section 15*b* having its narrowest portion at the periphery of its rotary motion (see (ii)).

It will be apparent to a person skilled in the art, from the foregoing description, that modifications and variations can be made to the described embodiments without departing from the scope of the invention as defined by the appended claims.

The invention claimed is:

1. A wing member for an air vehicle, said wing member comprising a core section defining its longitudinal axis and having upper and lower surfaces, wherein said lower surface comprises first apparatus selectively configurable between at least two positions wherein in a first, fully extended position, at least portions of said first apparatus extend outwardly from said lower surface so as to increase the effective cross-sectional area thereof and define an effective aerofoil in respect thereof in a first direction of movement of said wing member, and said upper surface comprises second apparatus selectively configurable between at least two positions wherein, in a first fully extended position, at least portions of said second apparatus extend outwardly from said upper surface so as to increase the effective cross-sectional area thereof and define an effective aerofoil in respect thereof in a second, substantially opposite, direction of movement of said wing member.

2. The wing member according to claim 1, wherein said first and/or second apparatus is selectively configurable between said fully extended position and at least a rest position, in which said apparatus is substantially flush with a respective surface.

3. The wing member according to claim 1, wherein said first and/or second apparatus is selectively configurable between said fully extended position and at least a partially extended position in which extend outwardly from a respective surface to a lesser degree than in said fully extended position so as to increase the effective cross-sectional area of said wing member and define an aerofoil in respect thereof in a respective direction of movement of said wing member.

4. The wing member according to claim 1, wherein said first and/or second apparatus comprises a plurality of spaced-apart fins mounted on a respective surface for movement between said at least two positions.

5. The wing member according claim 4, wherein each of said plurality of fins is mounted on said respective surface via a respective actuator.

6. The wing member according to claim 3, wherein said first apparatus comprises a first set of spaced-apart fins mounted on said lower surface and said second apparatus comprises a second set of spaced-apart fins mounted on said upper surface of said wing member, each set of fins being configured for operation one of said fully extended and partially extended positions.

7. The wing member according to claim 6, wherein an elastic and/or flexible skin member is provided over said plurality of fins so as to couple the distal ends of adjacent fins, and form a substantially continuous outer surface.

8. The wing member according to claim 1, wherein said first and/or second apparatus comprises at least a first inflatable aero-structure mounted across said upper or said lower surface of said wing member.

9. The wing member according to claim 8, wherein said inflatable aero-structure is operable between a fully extended position in which it is substantially fully inflated so as to increase the effective cross-sectional area of said wing member in accordance with the respective configuration of said inflatable aero-structure, and at least a second position.

10. The wing member according to claim 9, wherein said second position is a rest position in which said inflatable aero-structure is substantially fully deflated and lies substantially flush with said respective surface.

11. The wing member according to claim 9, wherein said second position is a partially extended position in which said inflatable aero-structure is partially inflated.

12. An air vehicle comprising a main body and a pair of opposing fixed wing members extending laterally from said main body, at least a first propulsion device being configured to generate linear thrust relative to said main body, in use, the air vehicle further comprising a control module for generating a control signal to reverse, in respect of at least one of said propulsion devices, the direction of linear thrust generated thereby relative to said main body, wherein at least one of said wing members is provided with a device for altering the aerofoil cross-section thereof in response to a reversal of thrust direction by a respective propulsion device.

13. The air vehicle according to claim 12, wherein at least one of said wing members comprises a wing member comprising a core section defining its longitudinal axis and having upper and lower surfaces, wherein said lower surface comprises first apparatus selectively configurable between at least two positions wherein in a first, fully extended position, at least portions of said first apparatus extend outwardly from said lower surface so as to increase the effective cross-sectional area thereof and define an effective aerofoil in respect thereof in a first direction of movement of said wing member, and said upper surface comprises second apparatus selectively configurable between at least two positions wherein, in a first fully extended position, at least portions of said second apparatus extend outwardly from said upper surface so as to increase the effective cross-sectional area thereof and define an effective aerofoil in respect thereof in a second, substantially opposite, direction of movement of said wing member.

14. The air vehicle according to claim 12, wherein said wing member comprises at least two sections, separably mounted together along a longitudinal joint when said direction of linear thrust generated by a respective propulsion device relative to said main body is in a first direction, wherein at least one of said sections is laterally movable relative to the other so as to separate said two sections when said direction of linear thrust generated by said propulsion device relative to said main body is reversed.

15. A method of controlling the effective aerofoil cross-section of a wing member in the air vehicle according to claim 12, comprising the steps of:
determining that a direction of thrust generated by a propulsion device has been reversed; and
generating one or more control signals configured to actuate said device to alter the aerofoil cross-section of a respective wing member so as to be effective in the determined direction of thrust.

16. The air vehicle according to claim 12, wherein at least one of said wing members comprises a core section defining its longitudinal axis and having upper and lower surfaces, wherein said lower surface comprises first apparatus selectively configurable between at least two positions wherein in a first, fully extended position, at least portions of said first apparatus extend outwardly from said lower surface so as to increase the effective cross-sectional area thereof and define an effective aerofoil in respect thereof in a first direction of movement of said wing member, and said upper surface comprises second apparatus selectively configurable between at least two positions wherein, in a first fully extended position, at least portions of said second apparatus extend outwardly from said upper surface so as to increase the effective cross-sectional area thereof and define an effective aerofoil in respect thereof in a second, substantially opposite, direction of movement of said wing member, wherein said first and/or second apparatus is selectively configurable between said fully extended position and at least a rest position, in which said apparatus is substantially flush with a respective surface.

17. The air vehicle according to claim 12, wherein at least one of said wing members comprises a core section defining its longitudinal axis and having upper and lower surfaces, wherein said lower surface comprises first apparatus selectively configurable between at least two positions wherein in a first, fully extended position, at least portions of said first apparatus extend outwardly from said lower surface so as to increase the effective cross-sectional area thereof and define an effective aerofoil in respect thereof in a first direction of movement of said wing member, and said upper surface comprises second apparatus selectively configurable between at least two positions wherein, in a first fully extended position, at least portions of said second apparatus extend outwardly from said upper surface so as to increase the effective cross-sectional area thereof and define an effective aerofoil in respect thereof in a second, substantially opposite, direction of movement of said wing member, wherein said first and/or second apparatus is selectively configurable between said fully extended position and at least a partially extended position in which extend outwardly from a respective surface to a lesser degree than in said fully extended position so as to increase the effective cross-sectional area of said wing member and define an aerofoil in respect thereof in a respective direction of movement of said wing member.

18. The air vehicle according to claim 12, wherein at least one of said wing members comprises said wing member comprising a core section defining its longitudinal axis and having upper and lower surfaces, wherein said lower surface comprises first apparatus selectively configurable between at least two positions wherein in a first, fully extended position, at least portions of said first apparatus extend outwardly from said lower surface so as to increase the effective cross-sectional area thereof and define an effective aerofoil in respect thereof in a first direction of movement of said wing member, and said upper surface comprises second apparatus selectively configurable between at least two positions wherein, in a first fully extended position, at least portions of said second apparatus extend outwardly from said upper surface so as to increase the effective cross-sectional area thereof and define an effective aerofoil in respect thereof in a second, substantially opposite, direction of movement of said wing member,
wherein said first and/or second apparatus comprises a plurality of spaced-apart fins mounted on a respective surface for movement between said at least two positions.

19. The air vehicle according to claim 18, wherein each of said plurality of fins is mounted on said respective surface via a respective actuator.

20. The air vehicle according to claim 17, wherein said first apparatus comprises a first set of spaced-apart fins mounted on said lower surface and said second apparatus comprises a second set of spaced-apart fins mounted on said upper surface of said wing member, each set of fins being configured for operation one of said fully extended and partially extended positions.

* * * * *